United States Patent [19]

Bergner

[11] Patent Number: 4,501,520

[45] Date of Patent: Feb. 26, 1985

[54] EXPANSION DOWEL ASSEMBLY

[75] Inventor: Arndt Bergner, Munich, Fed. Rep. of Germany

[73] Assignee: Hilti Aktiengesellschaft, Schaan, Liechtenstein

[21] Appl. No.: 398,827

[22] Filed: Jul. 16, 1982

[30] Foreign Application Priority Data

Jul. 20, 1981 [DE] Fed. Rep. of Germany ....... 3128610

[51] Int. Cl.³ ............................................ F16B 13/04
[52] U.S. Cl. ...................................... 411/21; 411/33; 411/77
[58] Field of Search ........................ 411/21, 22, 23, 32, 411/33, 25, 55, 57, 75, 76, 77, 78, 79, 80

[56] References Cited

U.S. PATENT DOCUMENTS 4,270,434 6/1981 Bucheli ................................ 411/71
4,293,259 10/1981 Liebig .................................. 411/32

FOREIGN PATENT DOCUMENTS 2138300 2/1972 Fed. Rep. of Germany ........ 411/55
2535066 3/1977 Fed. Rep. of Germany .
46-21128 6/1971 Japan ..................................... 411/55
338589 7/1959 Switzerland .......................... 411/55
344832 4/1960 Switzerland .......................... 411/55
227800 9/1968 U.S.S.R. ............................... 411/80

Primary Examiner—Thomas J. Holko
Attorney, Agent, or Firm—Toren, McGeady and Stanger

[57] ABSTRACT

An expansion dowel assembly is used to anchor a part to the surface of a structural member. The expansion dowel assembly is inserted into and anchored within a borehole in the structural member. The assembly includes a support tube, an anchor rod extending axially through the support tube, and expansion elements positioned within the support tube so as to be radially displaced by the anchor rod into anchoring engagement with the structural member. The expansion elements are positioned within the support tube in bearing contact with a support surface. The support surface contacting the expansion elements faces toward the bottom of the borehole into which the dowel assembly is inserted. The support surface is a web formed as part of the support tube and it is axially displaceable when a force acting on the anchor rod exceeds a predetermined level.

18 Claims, 5 Drawing Figures

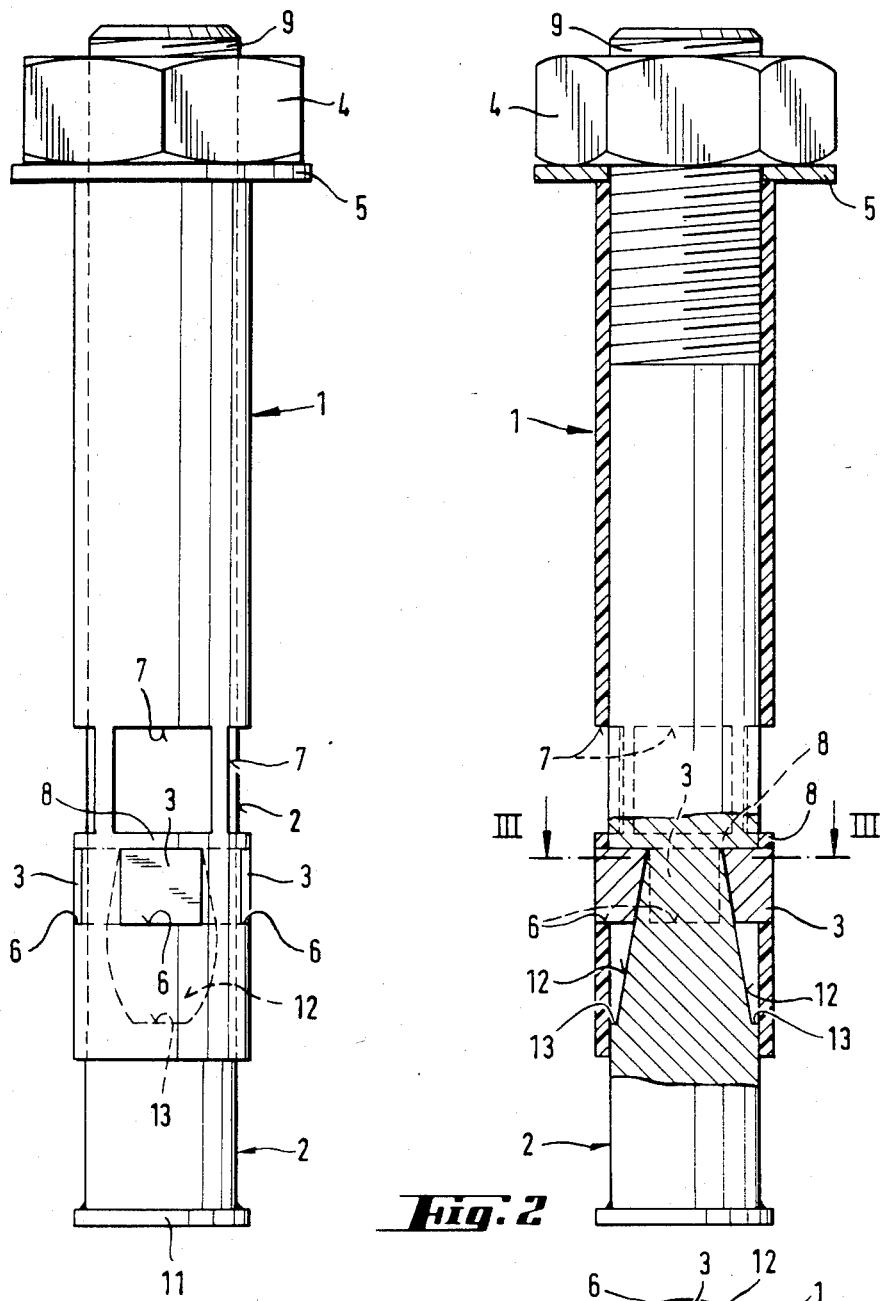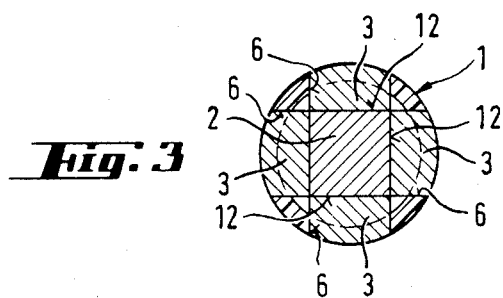

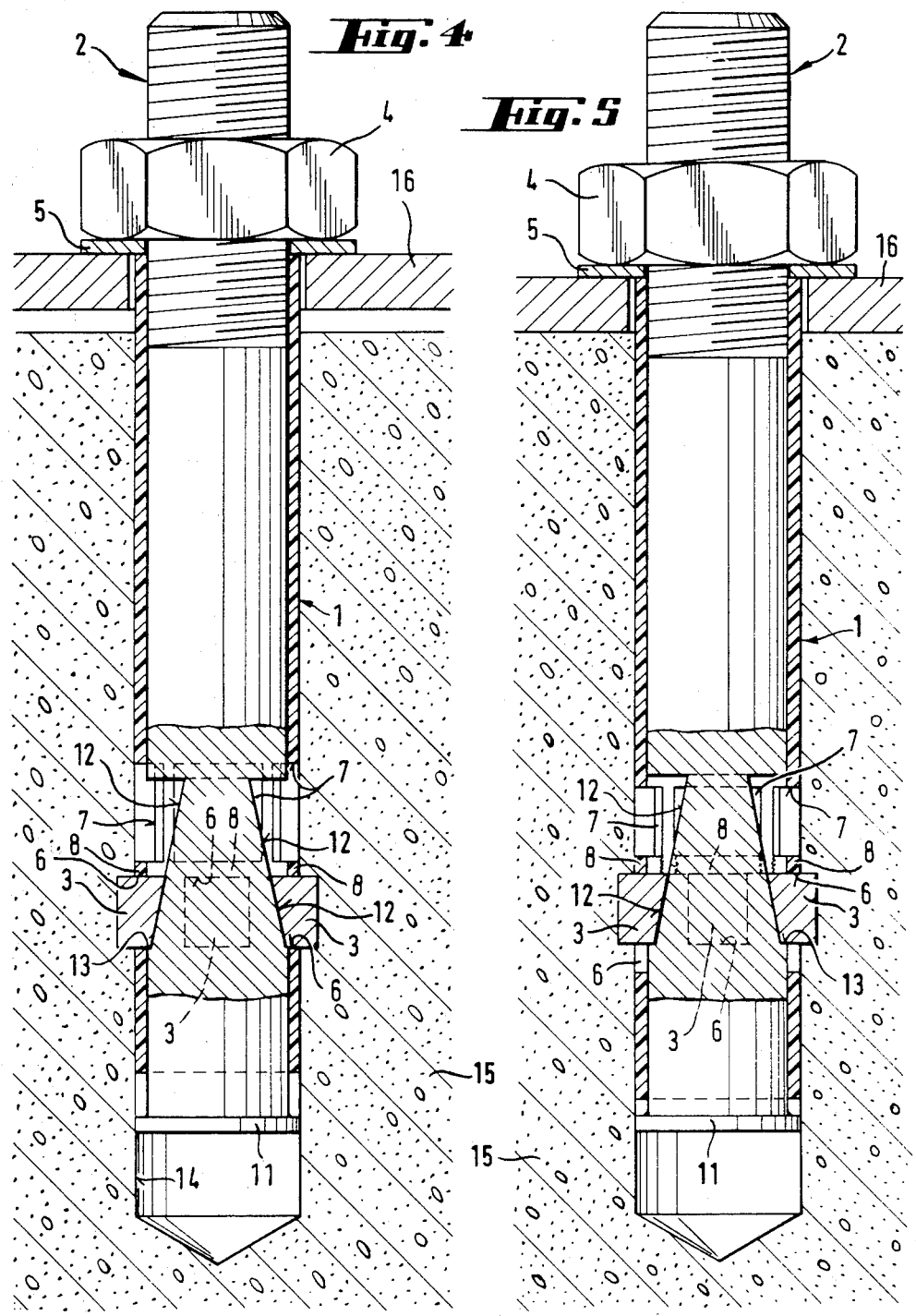

EXPANSION DOWEL ASSEMBLY

SUMMARY OF THE INVENTION

The present invention is directed an expansion dowel assembly including a support tube, an anchor rod including force application means, and expansion elements located within the support tube and bearing against a support surface which faces toward the leading end of the support tube. The expansion elements can be displaced radially outwardly beyond the outside surface of the support tube when the anchor rod is displaced axially relative to the tube.

Expansion dowel assemblies of the above type serve, as a rule, to secure parts to a structural member. Accordingly, the expansion dowel assemblies are anchored within receiving boreholes in the structural member by displaceable expansion elements. A support tube is inserted into the borehole and an anchor rod extends through the support tube and outwardly of the borehole beyond the part to be secured to the structural member. One end of the support tube is flush with the outer surface of the part being secured. An abutment member, such as a nut, fits onto the outwardly projecting end of the anchor rod and the abutment member can be fitted against the part to be held on the structural member.

In practice it has been noted that the part to be secured, such as a steel bar or rail, does not initially fit tightly against the surface of the structural member and any play or spacing between the two may be attributable to imperfectly formed surfaces on the part or on the structural member. When the part is being secured to the structural member it is important to eliminate any spacing between the two to obtain a secure and complete surface contact of the part to the structural member.

An important requirement for eliminating any spacing between the two components is that the support tube which extends through the part must be displaceable toward the expansion elements which previously have been anchored into the surface forming the receiving borehole. In a known expansion dowel assembly, a plastic sleeve insertable between the support tube and the expansion elements has been used so that it can be axially shortened.

In addition to the disadvantage that such an expansion dowel assembly is made up of many parts, to achieve the anchoring of the assembly relatively great forces must be exerted, accordingly, the assembly can only be used in materials having a corresponding force absorption capacity, such as concrete. Where concrete is used, for a slight radial displacement of the expansion elements it is possible to attain high anchoring forces.

When these expansion dowel assemblies are to be anchored in a material of lesser strength, such as masonry, the radial displacement of the expansion elements into the material must be relatively long. As a result, expansion elements of relatively large dimension must be guided in the support tube if an adequate expansion and anchoring effect is to be achieved.

In another known expansion dowel assembly, the expansion elements are, for this reason, retained radially displaceable in openings in the support tube. The expansion elements bear against an abutment formed by the support tube or by a wall of the opening facing opposite to the direction in which the anchor rod moves relative to the support tube. The abutment or support surface prevents axial displacement of the support tube relative to the expansion elements fixed in the structural member. With such an expansion dowel assembly, it is not possible to eliminate any open spaces between the part being secured and the structural member.

Therefore, it is the primary object of the present invention to provide an expansion dowel assembly of the type described above which is also suitable for use in receiving materials of relatively low strength, such as masonry, and providing the possibility of eliminating any open spaces between the part being secured and the structural member. A particular feature of the invention is its simplicity.

In accordance with the present invention, a seat or support surface in the form of a web permits movement of the support tube relative to the anchor rod when a predetermined force acting on the rod is exceeded so that any open space between the part being secured and the structural member is eliminated.

By supporting the expansion elements on a support surface formed of a flexible web it is assured that, after the first phase of anchoring the dowel assembly in the structural member is completed, in a second phase the support tube can be axially displaced relative to the anchor rod in the direction toward the expansion elements by applying force to the end of the support tube located in the plane of the outside surface of the part being secured. The abutment or contact with the outer end of the support tube is effected by a nut threaded onto the anchor rod. During the second phase, the force transmitted from the nut on the anchor rod to the end of the support tube causes at least a deformation of the web or support surface, and if the open space to be overcome between the two components is considerable, the support surface or web will break. Accordingly, the part is forced against the surface of the structural member and any open space between them is reduced.

Preferably, the support surface or web is formed by one side of a window-like opening in the support tube with the support surface facing in the direction opposite to the direction in which the anchor rod moves axially relative to the support tube in effecting anchoring engagement within the receiving material forming the structural member. The window-like opening provides a corresponding free space so that after the support surface or web is broken the support tube can move axially into the borehole to overcome any open spaces between the part being secured and the structural member. To attain adequate deformation or breakage of the web, it is preferable if the width of the window-like opening is greater than the width of the corresponding expansion element.

In one embodiment of the invention, each expansion element is provided with a corresponding web formed by a window-like opening. Such an arrangement assures uniform interaction between each expansion element and the web associated with it. Preferably, the window-like openings and their webs along with the associated expansion element are advantageously distributed equiangularly about the circumference of the support tube and in the same axial region.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an elevational view of an expansion dowel assembly embodying the present invention;

FIG. 2 is an axially extending sectional view of the expansion dowel assembly shown in FIG. 1;

FIG. 3 is a cross-sectional view taken along the line III—III in FIG. 2;

FIG. 4 is an axially extending sectional view of the expansion dowel assembly illustrated in FIGS. 1, 2 and 3, however, showing the assembly in the spread or expanded state with an open space between the part to be secured and the structural member; and FIG. 5 is an axially extending sectional view similar to FIG. 4, however, illustrating the expansion dowel assembly after the open space between the part and the structural member has been reduced.

In FIG. 1 an expansion dowel is shown with each of its parts having a leading end and a trailing end. As can be seen in FIG. 4 the leading end is the end which passes first into the receiving borehole for the assembly in a receiving material or structural member 15. The expansion dowel assembly includes an axially elongated support tube 1 with an anchor rod 2 extending axially through the tube so that its leading end, as shown in FIG. 1 projects outwardly from the leading end of the support tube. Similarly, the trailing end of the rod extends outwardly from the trailing end of the tube. Expansion elements 3 are located within the support tube 1 in contact with the anchor rod 2. A nut 4 screwed onto the trailing end of the anchor rod 2 forms an abutment bearing against a washer 5 resting on the trailing end of the support tube 1. The nut 4 holds the washer 5 against the trailing end of the support tube 1.

Between its leading and trailing end, support tube 1 has four apertures 6 equiangularly spaced about its circumference. An expansion element 3 is located within each of the apertures 6 so that it can be displaced radially outwardly. As viewed in FIGS. 1 and 2 the expansion elements 3 are in the insertion position of the expansion dowel assembly so that they can be inserted into a prepared borehole without interferring with such insertion. For ease in manufacture and ready displaceability of the expansion elements 3, the support tube is made of a plastics material. On the trailing end side of the apertures 6, each aperture has an associated window-like opening 7 extending through the support tube with a web 8 forming a separation between each aperture 6 and its adjoining opening 7. The aperture 6 and the opening 7 extend in the axial direction of the support tube as well as in its circumferential direction. To draw or pull the anchor rod 2 into the support tube 1, the abutment or nut 4 is threaded or tightened onto the anchor rod in engagement with the thread or force engagement means 9. At its leading end, the anchor rod 2 has a collar 11 extending laterally outwardly from the outside surface of the rod and protecting the leading end face of the support tube against mechanical damage when the dowel assembly is placed into a receiving borehole.

As shown in FIG. 2, spaced from its leading end, the anchor rod 2 has wedge surfaces 12 inclined relative to the axis of the rod with the surfaces inclined inwardly in the direction toward the trailing end of the rod. As shown in FIG. 2 the radially inner sides of the expansion elements 3 are in contact with the smaller end of the wedge surfaces 12. Further, the expansion elements are guided laterally by the apertures 6 in the support tube 1. When the anchor rod 2 is moved rearwardly through the support tube 1 its wedge surfaces 12 force the expansion elements 3 radially outwardly beyond the outside surface of the support rod. The leading end of each web surface is defined by a shoulder 13 extending perpendicularly of the anchor rod axis. When the radial displacement of the expansion elements 3 is completed, each of the shoulders 13 contacts the corresponding leading side of one of the expansion elements 3. In the cross-sectional view provided in FIG. 3, the four expansion elements 3 can be seen each in a separate aperture 6 formed in the support tube 1. Further, the square cross-sectional shape of the anchor rod 2 in the region of the wedge surfaces 12 can be noted.

When it is to be used, the expansion dowel assembly is inserted into a receiving borehole 14 in a structural member, as shown in FIG. 4. Further, the support tube 1 and the anchor rod 2 also pass through a part 16 to be secured onto the outside surface of the receiving material or structural member 15. The part 16, for instance because it may be curved, is spaced outwardly from the outside surface of the structural member 15.

In FIG. 4 the expansion dowel assembly has been spread laterally into anchoring engagement with the receiving material or structural member 15. By threading the nut 4 axially along the anchor rod 2, the anchor rod is pulled out of the borehole 14 so that the anchor rod is axially displaced relative to the support tube 1 in the direction toward its trailing end. As the anchor rod moves axially, its wedge surfaces 12 displace the expansion elements 3 radially outwardly through the apertures 6, as shown in FIG. 4 into anchoring engagement with the material forming the structural member 15. To facilitate such anchoring engagement, especially in structural members formed of a high-strength material, an encircling undercut can be formed in the wall of the receiving borehole 14 at an appropriate location inwardly from the surface of the borehole. The termination of the anchoring process can be recognized when the shoulders 13 on the leading ends of the wedge surfaces 12 contact the leading sides of the expansion elements 3. This is the position illustrated in FIG. 4, however, there is still an open space remaining between the juxtaposed surfaces of the part 16 and the structural member 15.

To place the juxtaposed surfaces of the part 16 and the structural member 15 in closely fitting engagement, the nut 4 is further tightened onto the anchor rod 2. Because of having reached a high expansion force or since the shoulders 13 have moved into contact with the expansion elements 3 which are fixed relative to the structural member 15, the anchor rod can no longer be displaced axially relative to the structural member. Accordingly, as the nut 4 is further tightened onto the anchor rod 2 the forces generated are transmitted through the nut 4 to the washer 5 and then to the trailing end of the support tube 1 which is flush with the outside surface of the part 16 being secured. The force acting on the support tube is transmitted along the support tube to the webs 8 in contact with the trailing sides of the expansion elements 3 rigidly secured in the structural member 15. If the force developed exceeds the force absorption capacity of the webs 8, the webs deform and possibly break, as shown in FIG. 5. With continued tightening of the nut 4 on the anchor rod 2 the support tube 1 is moved axially inwardly in the direction toward its leading end permitting the part 16 to move into surface contact with the outside surface of the structural member 15. This arrangement can be appreciated from FIG. 5. It can be noted that the axial length of the window-like opening 7 in FIG. 5 is considerably less than that in FIG. 4 due to the inward movement of the support tube 1.

While specific embodiments of the invention have been shown and described in detail to illustrate the application of the inventive principles, it will be understood that the invention may be embodied otherwise without departing from such principles.

I claim:

1. An expansion dowel assembly comprising an axially elongated support tube having a leading end arranged to be inserted first into a borehole into which the assembly is to be anchored and a trailing end, an axially elongated anchor rod having a leading end and a trailing end with said anchor rod located within said support tube with the trailing end thereof extending axially out of the trailing end of said support tube, means engageable with the trailing end of said anchor rod for effecting axially displacement of said anchor rod relative to said support tube when the assembly is to be anchored within a borehole, said support tube having a support surface thereon extending transversely of the axial direction thereof and located between the leading and trailing ends thereof, expansion elements mounted within said support tube and in bearing contact with said support surface thereon, said anchor rod is engageable with said expansion elements for radially displacing said expansion elements outwardly from the outside surface of said support tube when said anchor rod is displaced toward the trailing end of said support tube relative to said support tube, wherein said support surface comprises a transverse web yieldable in the axial direction of said support tube when a predetermined force acting axially on said anchor rod is exceeded.

2. An expansion dowel assembly, as set forth in claim 1, wherein the trailing sides of said expansion elements contact said web, a window-like opening in said support tube extending from the trailing end side of said web toward the trailing end of said support tube so that said web forms the leading end side of said opening.

3. An expansion dowel assembly, as set forth in claim 1 or 2, wherein each said expansion element is associated with a different one of said window-like openings.

4. An expansion dowel assembly, as set forth in claim 3, wherein said support tube has a number of apertures spaced equiangularly apart around said support tube with said apertures extending axially from said web toward the leading end of said support tube, each of said expansion elements guided within one of said apertures, a corresponding said window-like opening in said support tube for each said aperture with said apertures and openings spaced apart by said web.

5. An expansion dowel assembly, as set forth in claim 4, wherein said apertures and window-like openings are arranged symmetrically around the circumference of said support tube relative to the axis of said support tube and to one another, the circumferential dimension of each of said apertures is less than the circumferential dimension of said window-like openings.

6. An expansion dowel assembly, as set forth in claim 5, wherein said web is formed of a deformable plastics material so that when a predetermined force acting axially on said anchor rod is exceeded initially said web deforms in the axial direction and finally breaks permitting axial movement of said support tube relative to said anchor rod in the direction toward the leading end of said anchor rod.

7. An expansion dowel assembly, as set forth in claim 5, wherein said anchor rod has axially extending wedge surfaces converging inwardly in the direction toward the trailing end thereof, and one said wedge surface is in contact with one of said expansion elements for radially displacing said expansion element outwardly from the outside surface of said support tube.

8. An expansion dowel assembly, as set forth in claim 7, wherein said wedge-shaped surface has a square cross-section extending transversely of the axis of said anchor rod with each of the four wedge surfaces provided thereon in contact with a different one of four expansion elements mounted in said support tube.

9. An expansion dowel assembly, as set forth in claim 5, wherein a collar is located on the leading end of said anchor rod extending laterally outwardly from the outside surface thereof with the diameter of the circumferentially extending surface of said collar corresponding approximately to the diameter of the outside surface of said support tube.

10. An expansion dowel assembly comprising an axially elongated support tube having a leading end arranged to be inserted first into a borehole into which the assembly is to be anchored and a trailing end, an axially elongated anchor rod having a leading end and a trailing end with said anchor rod located within said support tube with the trailing end thereof extending axially out of the trailing end of said support tube, means engageable with the trailing end of said anchor rod for effecting axially displacement of said anchor rod relative to said support tube when the assembly is to be anchored within a borehole, said support tube having a support surface thereon extending transversely of the axial direction thereof and located between the leading and trailing ends thereof, expansion elements mounted within said support tube and in bearing contact with said support surface thereon, said anchor rod is engageable with said expansion elements for radially displacing said expansion elements outwardly from the outside surface of said support tube when said anchor rod is displaced toward the trailing end of said support tube relative to said support tube, wherein said support surface comprises a transverse web having a leading side and a trailing side spaced axially from said leading side and with said leading side and trailing side being axially spaced from the adjacent portions of said support tube, said leading side of said web being in contact with said expansion elements and being yieldable in the axial direction of said support tube toward the trailing end of said support tube when a predetermined force acting axially on said anchor rod is exceeded.

11. An expansion dowel assembly, as set forth in claim 10, wherein the trailing sides of said expansion elements contact said web, a window-like opening in said support tube extending from the trailing side of said web toward the trailing end of said support tube so that the trailing side of said web forms the leading end side of said opening.

12. An expansion dowel assembly, as set forth in claim 1 or 11, wherein each said expansion element is associated with a different one of said window-like openings.

13. An expansion dowel assembly, as set forth in claim 12, wherein said support tube has a number of apertures spaced equiangularly apart around said support tube with said apertures extending axially from the leading side of said web toward the leading end of said support tube, each of said expansion elements being guided within one of said apertures, a corresponding said window-like opening in said support tube for each said aperture with said apertures and openings spaced axially apart by said web.

14. An expansion dowel assembly, as set forth in claim 13, wherein said apertures and window-like openings are arranged symmetrically around the circumference of said support tube relative to the axis of said support tube and to one another, the circumferential dimension of each of said apertures is less than the circumferential dimension of said window-like openings.

15. An expansion dowel assembly, as set forth in claim 14, wherein said web is formed of a deformable plastics material so that when a predetermined force acting axially on said anchor rod is exceeded initially said web deforms in the axial direction and finally breaks permitting axial movement of said support tube relative to said anchor rod in the direction toward the leading end of said anchor rod.

16. An expansion dowel assembly, as set forth in claim 14, wherein said anchor rod has axially extending wedge surfaces converging inwardly in the direction toward the trailing end thereof, and one said wedge surface is in contact with one of said expansion elements for radially displacing said expansion element outwardly from the outside surface of said support tube.

17. An expansion dowel assembly, as set forth in claim 16, wherein said wedge-shaped surface has a square cross-section extending transversely of the axis of said anchor rod with each of the four wedge surfaces provided thereon in contact with a different one of four expansion elements mounted in said support tube.

18. An expansion dowel assembly, as set forth in claim 14, wherein a collar is located on the leading end of said anchor rod extending laterally outwardly from the outside surface thereof with the diameter of the circumferentially extending surface of said collar corresonding approximately to the diameter of the outside surface of said support tube.

* * * * *